United States Patent
Yasuda et al.

(10) Patent No.: US 7,262,892 B1
(45) Date of Patent: Aug. 28, 2007

(54) HOLOGRAM RECONSTRUCTION METHOD AND DEVICE

(75) Inventors: Shin Yasuda, Kanagawa (JP); Jiro Minabe, Kanagawa (JP); Katsunori Kawano, Kanagawa (JP); Yasuhiro Ogasawara, Kanagawa (JP); Koichi Haga, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/633,058

(22) Filed: Dec. 4, 2006

(30) Foreign Application Priority Data

Jun. 19, 2006 (JP) .............................. 2006-169231

(51) Int. Cl.
*G03H 1/16* (2006.01)
(52) U.S. Cl. ............................ 359/29; 359/10; 359/21; 369/103
(58) Field of Classification Search ................... 359/10, 359/11, 21, 29, 31–33; 369/103
See application file for complete search history.

(56) References Cited

U.S. PATENT DOCUMENTS

2001/0007592 A1* 7/2001 Pu et al. ...................... 382/116
2006/0152783 A1* 7/2006 Butler et al. ................... 359/24

FOREIGN PATENT DOCUMENTS

JP    A 2000-66566    3/2000
JP    A 2004-198816    7/2004

* cited by examiner

*Primary Examiner*—Leonidas Boutsikaris
(74) *Attorney, Agent, or Firm*—Oliff & Berridge, PLC

(57) ABSTRACT

There is provided a hologram reconstruction method including: onto an optical recording medium in which a hologram is recorded by simultaneously irradiating the Fourier transformed signal beam representing a digital data with a bright and dark image and removing a DC component and the Fourier transformed reference beam thereon, irradiating a first reference beam for reading out that is the same as the reference beam to generate a first diffracted light generated by the recorded hologram, and synthesizing a DC component of a predetermined phase with the generated first diffracted light to generate a first synthesized light; detecting an inverse Fourier transformed image of the first synthesized light to obtain first image data; irradiating a second reference beam for reading out that differs from the reference beam onto the hologram recorded on the optical recording medium to generate a second diffracted light from the recorded hologram, and synthesizing a DC component of a predetermined phase with the generated second diffracted light to generate a second synthesized light; detecting an inverse Fourier transformed image of the second synthesized light to obtain second image data; subtracting one of the first image data and the second image data from the other at each pixel of the light and dark image; and decoding the digital data based on the value obtained by subtraction.

25 Claims, 9 Drawing Sheets

SLM PATTERN (FOR RECORDING)

READOUT PATTERN 1

READOUT PATTERN 2

READOUT PATTERN REF P FOR RECONSTRUCTION OF POSITIVE IMAGE (ITS REFERENCE PATTERN IS REVERSED TO THE REFERENCE PATTERN USED ON RECORDING)

READOUT PATTERN REF N FOR RECONSTRUCTION OF NEGATIVE IMAGE (ITS REFERENCE PATTERN IS THE SAME AS THE REFERENCE PATTERN USED ON RECORDING)

RECORDING PATTERN

NEGATIVE RECONSTRUCTED IMAGE (Img_N)
READ OUT BY THE READOUT PATTERN (Ref_N)

BER=1.6 × $10^{-3}$

POSITIVE RECONSTRUCTED IMAGE (Img_P)
READ OUT BY THE READOUT PATTERN (Ref_P)

BER=1.5×10$^{-3}$

NOISE-REDUCED IMAGE
(NEGATIVE IMAGE IMG_N SUBTRACTED FROM POSITIVE IMAGE IMG_P)

BER=$8.1 \times 10^{-5}$

HOLOGRAM RECONSTRUCTION METHOD AND DEVICE

TECHNICAL FIELD

The present invention relates to a hologram reconstruction method and device, and particularly relates to a hologram reconstruction method and device where recorded digital data is reconstructed with good precision when the digital data has been recorded as a Fourier transform hologram.

RELATED ART

With holographic data storage, binary digital data [0,1] is turned into digital images (i.e., signal pattern) that are bright-and-dark distributions displayed on a spatial light modulator (hereafter, "SLM"), and the signal beam converted from the bright-and-dark distribution is Fourier transformed with a lens and irradiated onto an optical recording medium. Then the Fourier transformed image is recorded on the optical recording medium as a hologram. The Fourier transformed image of the digital data has, however, an extremely high intensity at the 0th-order so with holographic data storage, the dynamic range of the optical recording medium is wasted due to this 0th-order component (i.e., the direct current component). When seeking to increase the number of multiplexed holograms (i.e., the number of holograms recorded multiple times), the signal/noise ratio (S/N ratio) of the reconstructed image is greatly deteriorated. For this reason, there is a problem in that the number of multiplexed holograms cannot be increased.

SUMMARY

According to an aspect of the present invention, there is provided a hologram reconstruction method including: onto an optical recording medium in which a hologram is recorded by simultaneously irradiating the Fourier transformed signal beam representing a digital data with a bright and dark image and removing a DC component and the Fourier transformed reference beam thereon, irradiating a first reference beam for reading out that is the same as the reference beam to generate a first diffracted light generated by the recorded hologram, and synthesizing a DC component of a predetermined phase with the generated first diffracted light to generate a first synthesized light; detecting an inverse Fourier transformed image of the first synthesized light to obtain first image data; irradiating a second reference beam for reading out that differs from the reference beam onto the hologram recorded on the optical recording medium to generate a second diffracted light from the recorded hologram, and synthesizing a DC component of a predetermined phase with the generated second diffracted light to generate a second synthesized light; detecting an inverse Fourier transformed image of the second synthesized light to obtain second image data; subtracting one of the first image data and the second image data from the other at each pixel of the light and dark image; and decoding the digital data based on the value obtained by subtraction.

BRIEF DESCRIPTION OF THE DRAWINGS

Exemplary embodiments of the present invention will be described in detail based on the following figures, wherein.

DETAILED DESCRIPTION OF THE DRAWINGS

Figure 1:
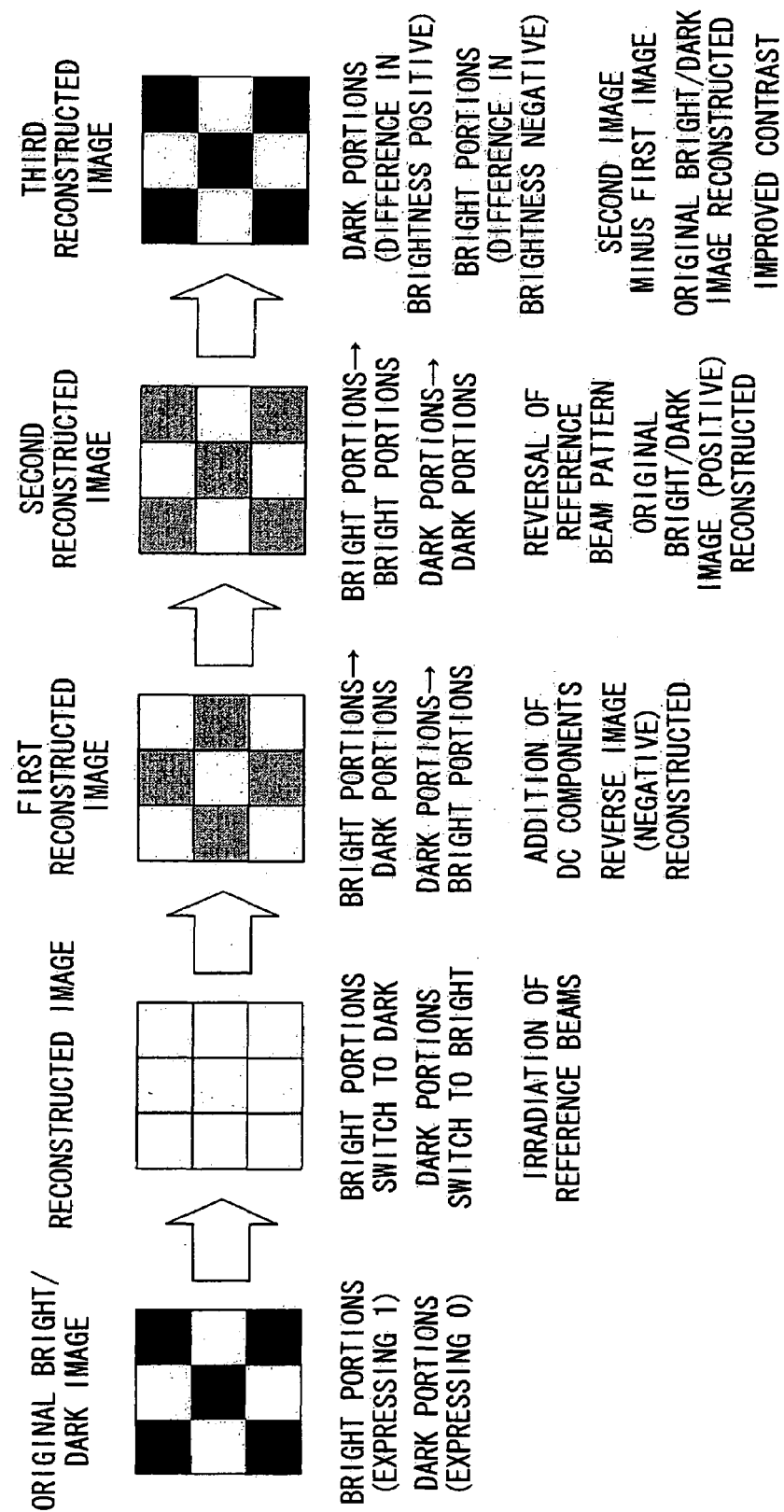
FIG. 1 is a drawing for explaining a digital data decoding principle.

Hereafter, an example of an embodiment of the present invention will be explained in detail while referring to the drawings.

(Digital Data Decoding Principle)

FIG. 1 is a drawing that explains a digital data decoding principle.

Here, a situation will be explained where binary digital data [0,1] is converted into a dark (black pixels) and bright (white pixels) distribution producing a signal beam and the signal beam is Fourier transformed. The direct current (hereafter "DC") component (0th-order component) is removed from the Fourier transformed image of the signal beam. In the case that will be explained, the signal beam having the DC component removed therefrom and a reference beam are simultaneously irradiated onto an optical recording medium, and an interference pattern is recorded as a hologram. Note that [0,1] can also be made to correspond to bright (white pixels) and dark (black pixels).

In the case where a hologram is recorded using a signal beam from which the DC component has been removed, when the reference beam is irradiated on the recorded hologram, diffracted light which is the same as the signal beam from which DC component is removed is regenerated. There is a tendency for the bright portions of the original bright image to become dark and for the dark portions to become bright in the inverse Fourier transformed image (i.e., in the reconstructed image) of this diffracted light. As a result, the contrast between the white pixels and the black pixels (or the S/N ratio) tends to worsen. The reason that the contrast in the reconstructed image becomes bad can be explained as follows.

Removing the DC component is equivalent to making the signal beam interfere with a π out-of-phase plane wave with respect the DC component of the signal beam, in which the intensity of the plane wave is the same as that of the DC component of the signal beam. For example, in a case of a signal beam that is composed of a single plane wave, when a π out-of-phase plane wave with the same intensity is made to interfere, the signal beam becomes 0 in intensity. Accordingly, in a case where signal beams (from which DC component has been removed) are modulated with digital data, this is equivalent to a result where plane waves having the same total strength and which are of the phase difference of π are made to interfere with the original signal beams.

In this case, the amplitude of the electrical field of the bright portions is small due to destructive interference so the strength lessens and these portions become dark. Meanwhile, the amplitude of the electrical field of the dark portions increases so the strength increases and these portions become bright. As a result, the strength of the portions that are bright and the portions that are dark becomes about even and contrast deteriorates.

Note that in the above explanation of contrast deterioration, the case is such that the number of white pixels and the number of black pixels in the digital pattern of the signal beams is substantially the same. Generally in a digital pattern, the number of white pixels and black pixels are substantially equal. When the number of white pixels is much higher than the number of black pixels, there are cases where the reconstructed image becomes a reversed image, i.e., where the brights and darks of the digital pattern of the signal beams are reversed. Nonetheless, the fact that there is a tendency for the bright portions of the original bright/dark image to become dark and for the dark portions to become bright is the common feature.

First, when the π out-of-phase DC component is added to the regenerated diffracted light, a reverse image (negative image) where the brights and darks of the original signal patterns are reversed can be obtained (i.e., a first reconstructed image). That is, when the phase of the additional DC component is different by π from the phase of the diffracted light from the hologram, the bright portions of the original bright/dark image become dark and the dark portions become light with the inverse Fourier transformed image of synthesized light. Note that, when the phase of the additional DC component is the same phase as the phase of the diffracted light from the hologram, the first reconstructed image becomes a positive image of the same brights and darks as the brights and darks of the original signal pattern. Nonetheless, here, a case will be explained where a negative image can be obtained as the first reconstructed image.

Next, when the reference beam of a reverse pattern is irradiated on the recorded hologram and the diffracted light is regenerated, and the π out-of-phase DC component is added to the regenerated diffracted light, synthesized light close to that of the original signal beam is generated and a positive image whose brights and darks are the same as in the original signal pattern can be obtained (i.e., a second reconstructed image). That is, with the inverse Fourier transformed image of synthesized light, the bright portions of the original bright/dark image are bright and the dark portions are dark.

When subtraction is performed for every pixel from the brightness of the second reconstructed image to the brightness of the first reconstructed image, the value obtained by subtracting becomes positive at the bright portions of the original bright/dark image and negative at the dark portions of the original bright/dark image. Further, the image obtained based on the brightness value after subtraction is a bright/dark image that is the same as that of the original signal pattern, and is a positive image whose contrast is higher than that of the second reconstructed image (i.e., the obtained image is a third reconstructed image).

If, for example, binary digital data [0,1] is defined as darks (black pixels) and brights (white pixels), as described above, then the value obtained by subtraction that is a positive image (bright portions) is "1" and the value obtained by subtraction that is a negative image (dark portions) is "0". In this manner, binary digital data can be reconstructed with good precision with the positive and negative values obtained by subtraction.

In the above-described example, the binary digital data [0,1] are respectively expressed as one pixel of dark (a black pixel) and bright (a white pixel). Explanations are given regarding a method where decoding processing is executed by performing subtraction processing on two types of reconstructed images. Nonetheless, it is also possible to express the binary digital data [0,1] with an assembly pattern within a page using the white and black pixels. For example, an encoding method is known (*Science,* 265,749-752 (1994)) that expresses one bit with two pixels (e.g., white/black=0, black/white=1). In this case, one type of reconstructed image (third reconstructed image) is used and decoding processing is executed. Next, the decoding processing method for this example will be explained.

Reconstructed images usually receive the effects of noise light that originates from the recording medium or the optical system when reading, and the S/N (signal-to-noise ratio) thus deteriorates. For this reason, the above-described negative image and positive image become images that include signal components and noise components, and the difference in brightness between the white pixels and black pixels (i.e., the difference in brightness) lessens. This phenomenon becomes more marked the more times multiple recordings are repeated. Accordingly, when decoding processing is executed using one of the negative image or positive image when there are many noise components, the bit error increases and it becomes difficult to properly restore the recorded data.

In contrast, when subtraction processing is performed where the brightness of the first reconstructed image (negative image) is subtracted from the brightness of the second reconstructed image (positive image), the third reconstructed image obtained from the subtraction processing becomes an image where the contrast is improved, i.e., S/N is also improved. The reason that the S/N is improved is because the first reconstructed image and second reconstructed image reconstructed from the same hologram include common noise components. So, by subtracting the brightness of the first reconstructed image from the brightness of the second reconstructed image, the common noise components are cancelled out. Accordingly, binary digital data can be reconstructed with good precision by performing decoding processing using the third reconstructed image with these improved S/Ns.

Further, the above-described example is explained where the brightness of the first reconstructed image is subtracted from the brightness of the second reconstructed image. Nonetheless, the opposite is also true, namely, the same decoding processing can be performed even if the brightness of the second reconstructed image is subtracted from the brightness of the first reconstructed image. Further, this processing can also be applied to multi-valued digital data.

Note that generation of the reconstructed image is achieved as a result of the interference between the diffracted light from the hologram and the additional DC component. That is, by setting the phase difference between the diffracted light and the DC component such that the amplitude of the interference waves (synthetic waves) increases, the original signal pattern is reconstructed.

Setting the phase of the DC component can be performed by appropriately changing the brightness of the pixels used in the signal pattern of the SLM. The SLM modulates and outputs incidented polarized light. Modulation of this polarized light is performed by phase modulation of the incident light and by modulation of the amplitude. In other words, phase modulation and amplitude modulation are possible due to the modulation of polarized light. Then, the size of the polarized light modulation depends upon the brightness of the image displayed on the SLM. Accordingly, the phase of the DC component can be set by setting the brightness of that image.

First Embodiment

Figure 2:
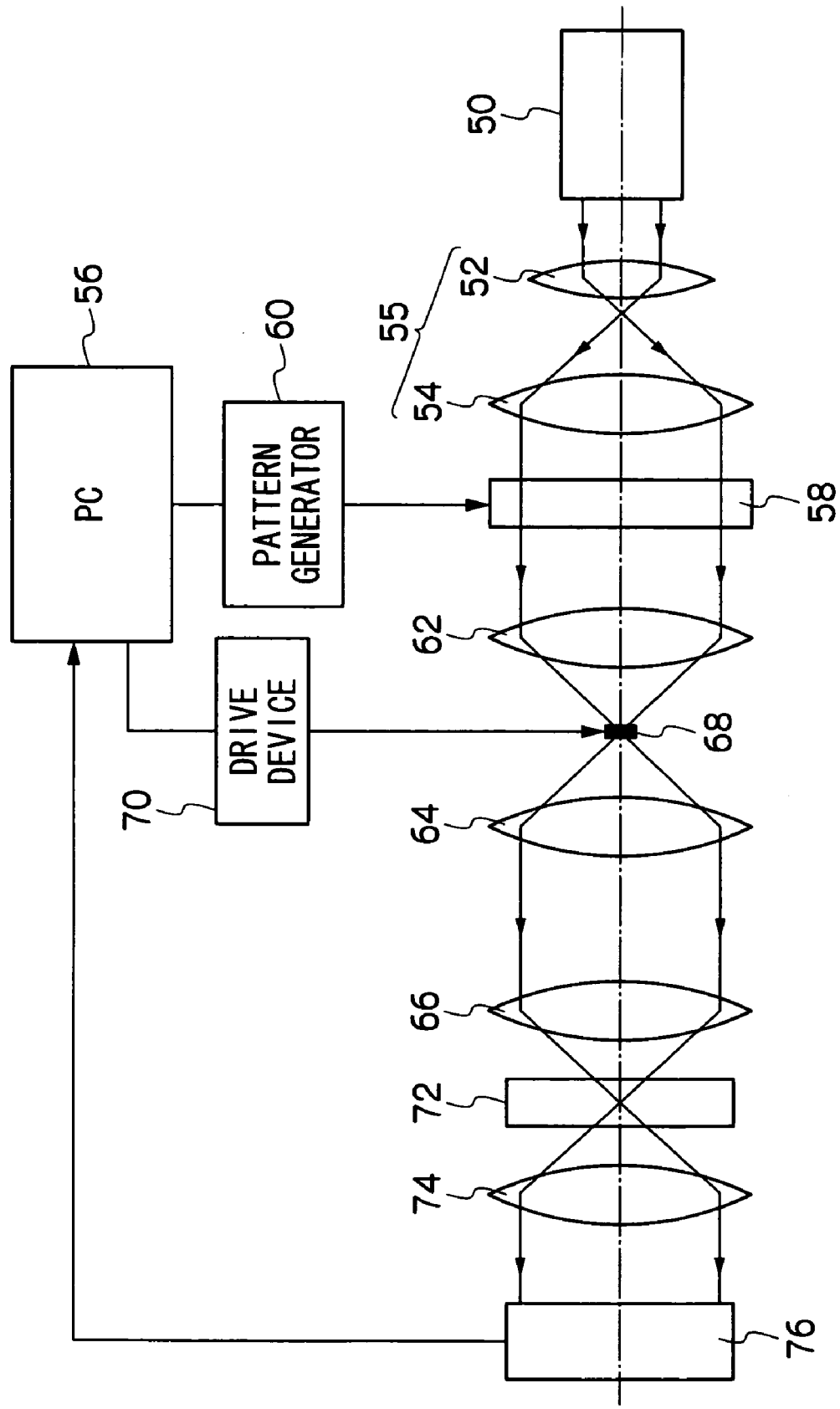
FIG. 2 is a drawing showing the overall structure of a hologram recording/reconstructing device according to an embodiment of the present invention.

FIG. 2 is a drawing showing the overall structure of a hologram recording/reconstructing device according to an embodiment of the present invention. With the present embodiment, explanations will be made regarding a recording/reconstructing device that uses a transmission-type SLM and a transmission-type optical recording medium. Signal beams and reference beams can be coaxially irradiated onto the optical recording medium with this hologram recording/reconstructing device.

A light source 50 that emits a laser beam that is coherent light is provided at this hologram recording/reconstructing device. A beam expander 55 consisting of lenses 52, 54 is arranged at the laser irradiating side of the light source 50. A transmission-type SLM 58 is arranged at the light transmitting side of the beam expander 55. The SLM 58 is connected to a PC 56 via a pattern generator 60. Note that, although not shown in the drawings, the PC 56 is equipped as usual with a CPU, ROM, RAM, memory, inputting device and outputting device.

The pattern generator 60 generates a pattern displayed on the SLM 58 in accordance with digital data supplied from the PC 56. The SLM 58 modulates the incidented laser in accordance with the displayed patterns (i.e., signal patterns and reference patterns) and generates signal beams) and reference beams for each page.

A polarizing plate (not shown), lenses 62, 64, a Fourier transformation lens 66 that irradiates signal beams and reference beams to an optical recording medium 72 are arranged at the light transmitting side of the SLM 58, in this order, along the light path. A mask 68 that removes DC components from the Fourier transformed images of the signal beams and reference beams is also provided between the lens 62 and the lens 64 so as to be insertable and removable relative to the light path. Further, the mask 68 is connected to the PC 56 through a 70 that drives the mask 68.

Any device can be used for the mask 68, as long as it can remove the DC component of a Fourier transformed image. For example, devices such as a micro-mirror that reflects only the DC component of a Fourier transformed image can be used, or a filter that absorbs only the DC component of a Fourier transformed image.

When a reference beam is irradiated on the optical recording medium 72 at the time of hologram reconstruction, the irradiated reference beam is diffracted by the hologram, and the diffracted light transmits through the optical recording medium 72 and is projected. Accordingly, there are a Fourier transformation lens 74 and a light detector 76, which consists of an imaging device such as a CCD or CMOS array and which converts reconstructed light that received light (the diffracted light) into an electrical signal and outputs it, and these are arranged at the side of the optical recording medium 72 from which the diffracted light is projected. The light detector 76 is connected to the PC 56.

Figure 3:
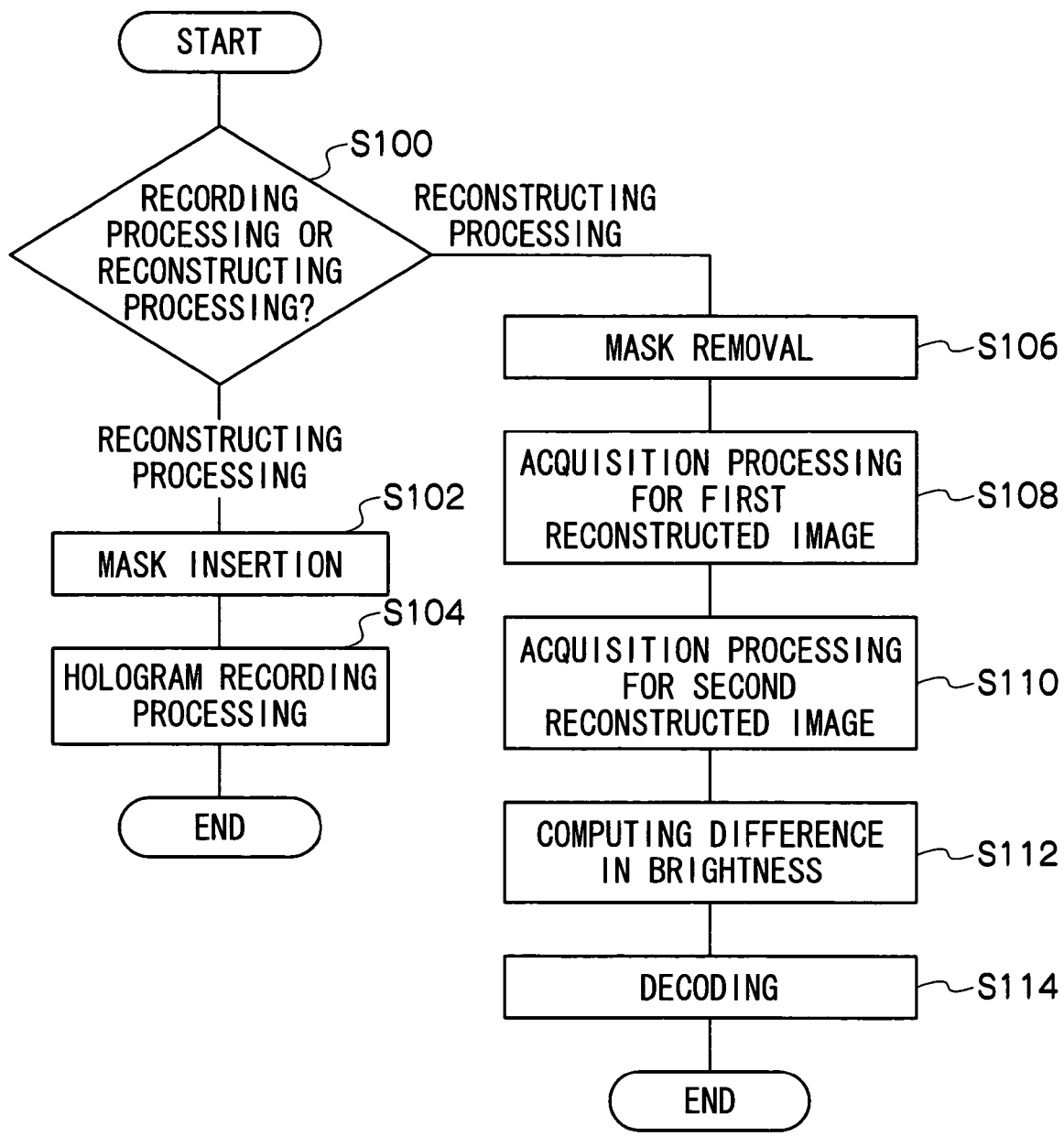
FIG. 3 is a flowchart showing the processing routine of recording/reconstructing processing.

FIG. 3 is a flowchart showing the processing routine of recording/reconstructing processing executed by the PC 56.

First, at step 100, a determination is made as to whether recording processing or reconstructing processing is selected, and when recording processing is selected, the 70 is driven and the mask 68 is inserted into the light path at step 102. At the next step 104, a laser beam is emitted from the light source 50 while digital data is outputted at predetermined timing from the PC 56, and hologram recording processing is executed and the routine ends.

Here, the recording processing for the hologram will be explained.

The laser beam emitted from the light source 50 is collimated into a large diameter beam with the beam expander 55 and then irradiated on the SLM 58. When digital data from the PC 56 is inputted, a signal pattern is generated at the pattern generator 60 in accordance with the supplied digital data. This signal pattern is combined with a previously prepared reference pattern, whereby the pattern displayed on the SLM 58 is generated. The laser beam is modulated into polarized light in accordance with the pattern displayed on the SLM 58, and the signal beams and reference beams are generated.

Figure 4:
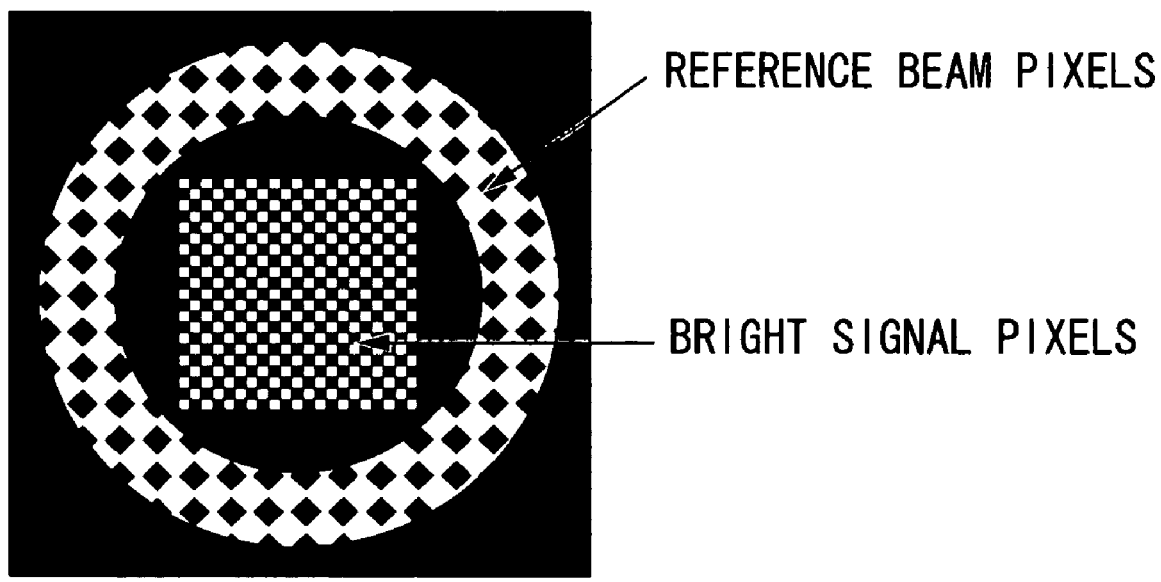
FIG. 4 is a drawing showing a display image of a SLM.

The central portion of the SLM 58 is used for data display (for the signal patterns) while the peripheral portions of the SLM 58 are used for the reference patterns (see FIG. 4). The laser beam incidented to the central portion of the SLM 58 is modulated in polarization in accordance with the displayed pattern, and the signal beam is generated. Meanwhile, the laser beam incidented to the peripheral portion of the SLM 58 is modulated in polarization in accordance with the displayed pattern, and the reference beam is generated. After that, the signal beam and the reference beam transmit through a polarizing plate (not shown), and these are converted to amplitude distribution.

The signal beam and reference beam generated at the SLM 58 are Fourier transformed by the lens 62. The Fourier transformed signal beam and reference beam are irradiated onto the mask 68, and the DC components are removed from the Fourier transformed image of the signal beam and reference beam. The signal beam and reference beam not blocked by the mask 68 are inverse Fourier transformed by the lens 64 and are once again Fourier transformed by the Fourier transformation lens 66, and are simultaneously and coaxially irradiated onto the optical recording medium 72. Due to this, the signal beam and the reference beam interfere inside the optical recording medium 72 and the interference pattern is recorded as a hologram.

For the optical recording medium 72, an optical recording medium for hologram recording using a recording material (e.g., a photopolymer or azo polymer, etc.) can be used.

At step 100 of FIG. 3, when reconstructing processing has been selected, the driving device 70 is driven at step 106 and the mask 68 is made to pull out of the light path. At the next step 108, the brightness value of the displayed image is calculated in order to add the DC component to the regenerated diffracted light. A laser beam is irradiated from the light source 50 while the calculated brightness value is outputted at predetermined timing from the PC 56, and acquisition processing for the first reconstructed image is executed.

Figure 5A:
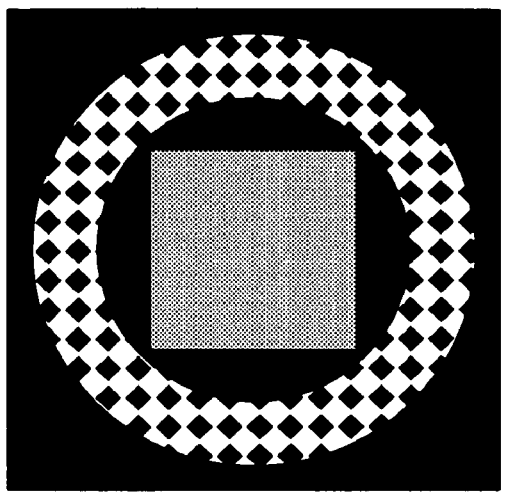
FIG. 5A is a drawing showing a display image of a SLM in a case where a first reconstructed image has been obtained.

With the acquisition processing for the first reconstructed image, as shown in FIG. 5A, an even pattern is displayed in the central portion of the SLM 58 (i.e., with pixels of brightness of the same brightness other than 0) and a reference beam pattern the same as at the time of recording is displayed at the peripheral portions of the SLM 58. Due to this, the laser beam incidented to the central portion of the SLM 58 is modulated evenly in polarization and DC component of the additional DC component is generated. Meanwhile, the laser beam incidented to the peripheral portions of the SLM 58 is modulated in polarization in accordance with the displayed pattern and the reference beam is generated. The degree of the polarization modulation can be controlled with the brightness value. Accordingly, the amount of phase shift can also be controlled with the brightness value. That is, the amount of the phase shift for the DC component and the reference beam can also be controlled with the brightness value.

After the additional DC component of the signal beam and the reference beam are transformed into amplitude distribution with a polarizing plate (not shown), the amplitude distribution irradiates the hologram in the optical recording medium 72 through the lenses 62, 64, 66. The irradiating reference beam is diffracted by the hologram and the diffracted light is transmitted through the optical recording medium 72 and projected. Further, the additional DC component of the signal beam transmit through the optical recording medium 72. The diffracted light emitted from the optical recording medium 72 and the additional DC component of the signal beam are inverse Fourier transformed by the Fourier transformation lens 74 and incidented to the light detector 76. Due to this, the reconstructed image can be observed on the focal plane of the Fourier transformation lens 74.

This reconstructed image (first reconstructed image) is detected by the light detector 76. The detected analog data is A/D converted by the light detector 76, and the image data of the first reconstructed image is inputted to the PC 56 and retained in the RAM (not shown). The first reconstructed image becomes a negative image of the original bright/dark image. When the cosine of the phase difference $\Delta\phi$ (cos $(\Delta\phi)$) between the additional DC component of the signal beams and the diffracted light from the hologram achieved with reconstructing processing is negative, the first reconstructed image becomes a negative image of the original bright/dark image.

Next, at step 110 of FIG. 3, a laser beam is emitted from the light source 50 while the brightness value calculated at step 108 is outputted at predetermined timing from the PC 56, and acquisition processing for the second reconstructed image is executed.

Figure 5B:
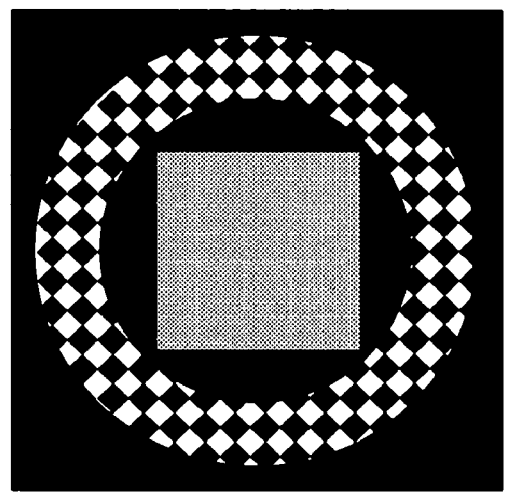
FIG. 5B is a drawing showing a display image of a SLM in a case where a second reconstructed image has been obtained.

With the acquisition processing for the second reconstructed image, as shown in FIG. 5B, an even pattern is displayed in the central portion of the SLM 58 (with a brightness the same as the pattern used in acquiring the first reconstructed image), and a reference pattern where the brights and darks have been reversed to those at the time of recording is displayed at the peripheral portions of the SLM 58. Due to this, the laser beam incidented to the central portion of the SLM 58 is modulated evenly in polarization and the additional DC component of the signal beam is generated. Meanwhile, the laser beam incidented to the peripheral portions of the SLM 58 is modulated in polarization in accordance with the displayed pattern and reference beam of the reverse pattern is generated. The intensity distribution of the reference pattern is reversed to the pattern used in acquiring the first reconstructed image. This means that the spatial frequency distribution is constant, but the phase is deviated by $\pi$.

After the additional DC component of the signal beam and the reference beam are transformed into amplitude distribution with a polarizing plate (not shown), the amplitude distribution irradiates the hologram in the optical recording medium 72 through the lenses 62, 64, 66. The irradiating reference beam is diffracted by the hologram and the diffracted light is transmitted through the optical recording medium 72 and emitted. As described above, the phase of the reference beam is deviated by $\pi$ relative to the phase of the reference beam used in acquiring the first reconstructed image. Accordingly, there is $\pi$ deviation in the diffracted light, too. Further, the additional DC component of the signal beam transmits through the optical recording medium 72. The diffracted light and the additional DC component of the signal beam emitted from the optical recording medium 72 are inverse Fourier transformed by the Fourier transformation lens 74 and then incidented to the light detector 76. The reconstructed image can be observed on the focal plane of the Fourier transformation lens 74.

This reconstructed image (second reconstructed image) is detected by the light detector 76. The detected analog data is A/D converted by the light detector 76, and the image data of the second reconstructed image is inputted to the PC 56 and retained in the RAM (not shown). The additional DC component is the same as that used in acquisition of the first reconstructed image, and the phase of the diffracted light is deviated by $\pi$ with respect to the phase of the diffracted light used in acquiring the first reconstructed image. Accordingly, when acquiring the second reconstructed image, the cosine $(\cos(\Delta\theta))$ of the phase difference $\Delta\theta=\Delta\phi-\pi$ between the additional DC component of the signal beam and the diffracted light from the hologram becomes positive. So the second reconstructed image becomes a positive image of the original bright/dark image.

When acquisition processing for the second reconstructed image is completed at step 110, the routine proceeds to the next step 112 and the difference in brightness is calculated. That is, the image data of the first reconstructed image and the image data of the second reconstructed image retained in the RAM are read out, and subtraction processing of the image data of the first reconstructed image from the image data of the second reconstructed image is performed, and subtraction processing is carried out (the difference in brightness is calculated) regarding each pixel of the digital image (signal pattern). Here, the third reconstructed image generated based on the brightness distribution (image data) after subtraction is a positive image of the same original bright/dark image of the second reconstructed image, and its contrast is higher than that of the first reconstructed image and second reconstructed image.

Next, at step 114, the third reconstructed image is used, the binary digital data is decoded and the routine is completed. Due to this, the digital data retained in the signal beam is decoded with good precision.

As explained above, with the present embodiment, hologram recording is performed in a state where the DC component has been removed from the Fourier transformed image of the signal beam, so unnecessary exposure due to DC component of the signal beam at the time of hologram recording is prevented. Further, the dynamic range can be effectively used and the capability for multiple recording is improved.

Also, with the present embodiment, when reference beam of the same pattern as during recording is irradiated on the recorded hologram, diffracted light is regenerated, and when $\pi$ out-of-phase DC component is added to the regenerated diffracted light, a reversed image (negative image) where the brights and darks of the original signal pattern is reversed can be obtained (i.e., the first reconstructed image). In contrast, when reference beam of the reverse pattern is irradiated on the recorded hologram, diffracted light is regenerated, and when π out-of-phase DC component is added to the regenerated diffracted light, synthesized light close to that of the original signal beam is generated, and a positive image of brights and darks, the same as in the original signal pattern, can be obtained (i.e., the second reconstructed image).

As described above, a third reconstructed image having high contrast with an improved S/N can be generated. This can be achieved by obtaining from the same hologram the first reconstructed image that is a negative image of the image signals and the second reconstructed image that is a positive image of the image signals, and then performing subtraction processing on each of the pixels of the image data of the second reconstructed image and the image data of the first reconstructed image, whereby the common noise components are cancelled and the third reconstructed image is generated.

By performing decoding processing based on the brightness value of the third reconstructed image after subtraction processing, the accuracy of digital data decoding improves. The above-described example is a case using encoding where digital data [0,1] is expressed with a combination pattern inside a page with white pixels and black pixels.

When the digital data [0,1] is each expressed with one pixel [bright (white pixel), dark (black pixel)], decoding processing can be carried out by performing subtraction processing on the two types of reconstructed images. That is, in this case, the third reconstructed image after subtraction processing is not used. The brightness of each of the pixels of the first reconstructed image and the second reconstructed image is used, one is subtracted from the other, and the digital data can be decoded with the positive and negative or the value of that difference. With this encoding method, one bit can be expressed with one pixel so high-density recording can be achieved.

Alternate Example of the Embodiment

Note that with the above-described embodiment, an example is explained where reference beam of a reverse pattern are used in reconstruction, however, the reference beam irradiated at the time of acquisition of the second reconstructed image are not limited to the reference beams of the reverse pattern. Reference beams differing from the reference beam from the time of recording can be used, that is, they can be reference beams where the spatial frequency is the same as the reference beams from when recording but where the phase is different.

Further, in the above-described embodiment, an example is explained where subtraction processing of the image data of the second reconstructed image from the image data of the first reconstructed image is performed and a new third reconstructed image is generated. Nonetheless, subtraction processing of the image data of the first reconstructed image from the image data of the second reconstructed image can also be performed so that a new third reconstructed image is generated. It is preferable that subtraction processing is performed so that the image data of a negative image is subtracted from the image data of a positive image, and that the differences in brightness be calculated. By subtracting the image data of a negative image is subtracted from the image data of a positive image, the efficiency of noise removal improves.

Further, with the above-described embodiment, an example is explained where the signal beams and the reference beams are irradiated coaxially onto the optical recording medium. However, the present invention can also be applied to recording methods of two-light wave optical systems where the signal beams and the reference beams are not irradiated coaxially onto the optical recording medium.

Further, with the above-described embodiment, a case is explained where DC component of π out-of-phase phase is added to diffracted light, and a negative image is obtained as the first reconstructed image and a positive image is obtained as the second reconstructed image, however, the present invention is not limited to this situation. Reconstructed images of a positive image and a negative image can be acquired from one hologram by controlling the phase difference between the diffracted light and the DC component from the hologram. For example, in the case where the phase of the additional DC component is the same as the phase of the diffracted light from the hologram, the first reconstructed image becomes a positive image where the brights and darks are the same as the brights and darks of the original signal pattern. In this case, a positive image can be obtained as the first reconstructed image and a negative image can be obtained as the second reconstructed image, the brightness of the second reconstructed image can be subtracted from the brightness of the first reconstructed image, and the third reconstructed image can be generated.

Further, in the above-described embodiment, the additional DC components used when acquiring the first reconstructed image and the second reconstructed image are common, however, it is not necessary for those DC components to be common. The positive/negative of the cosines of the phase differences of the additional DC component and the diffracted light from the hologram (i.e., $\cos(\Delta\phi)$ and $\cos(\Delta\theta)$) can be made opposite each other. Namely, these can be made so that the $\cos(\Delta\phi)*\cos(\Delta\theta)<0$.

Next, mathematical formulas will be used to explain the principle of the method for acquiring the above-described negative and positive reconstructed images.

The amplitude distribution of an arbitrary signal pattern expressed in recording processing with a SLM is made to be $s(x,y)$. The value of $s(x,y)$ is made such that black pixels are 0 and white pixels are 1. When $s(x,y)$ is Fourier transformed, Fourier components $S(\mu, \nu)$ can be obtained. When $S(\mu, \nu)$ are broken into DC component $S_{DC} \delta(\mu, \nu)$ and higher order components $S_H(\mu, \nu)$, these can be expressed as in the following formula.

$$S(\mu,\nu)=S_{DC}\delta(\mu,\nu)+S_H(\mu,\nu)$$

With recording processing, only $S_H(\mu, \nu)$ is irradiated onto the recording medium because the DC component is removed. Meanwhile, if the amplitude distribution of the reference pattern is made $r(x,y)$ and higher order components where the DC component has been removed from the Fourier components is $R_H(\mu, \nu)$ and these are irradiated onto the recording medium, these interfere with $S_H(\mu, \nu)$ whereby the hologram is recorded.

In the first reconstructing processing, a reference pattern $r(x,y)$ used at the time of recording is displayed together with a pattern for additional DC component (where the brightness is constant) on a SLM. When these are Fourier transformed and irradiated on a hologram, the $S_H(\mu, \nu)$ is generated from the hologram due to the $R_H(\mu, \nu)$ and the additional DC component transmits through the hologram. These are inverse Fourier transformed with a lens, incidented to a light detector and detected. The intensity distribution $I(x',y')$ of the light incidented to the light detector is shown in the following Formula (1).

$$I(x',y') \propto \{1+1/[a_{DC}\cos(\Delta\phi)]ts_H(x',y')\}^2 \quad \text{Formula (1)}$$

Here, $a_{DC}$ is the amplitude of the additional DC component (a positive number), $\Delta\phi$ is the phase difference between the additional DC component and the diffracted light, t is a positive coefficient that depends on the diffraction efficiency, and $s_H(x',y')$ is the inverse Fourier transform of $S_H(\mu, \nu)$. When $\cos(\Delta\phi)>0$, $I(x',y')$ becomes a positive image. Conversely, when $\cos(\Delta\phi)<0$, $I(x',y')$ becomes a negative image. The determination as to whether the $\cos(\Delta\phi)$ will be positive or negative depends on the characteristics of the SLM being used. In the present invention, $\cos(\Delta\phi)$ can be either positive or negative, and a reconstructed image can be obtained where the contrast is reversed by using the second reconstructing processing method that will be described next.

In the second reconstructing processing, with the exception of the fact that a pattern where the brights and darks have been reversed from the reference pattern used during recording [1−r(x,y)] is used, the processing is the same as in the first reconstructing processing. When the reference pattern used in the second reconstructing processing is Fourier transformed, it becomes $A \delta(\mu, \nu) - R_H(\mu, \nu)$ (where A is a constant). The δ function of the first term does not allow diffracted light to be generated from the hologram. Meanwhile, $-R_H(\mu, \nu)$ has the same spatial frequency distribution as the reference beam $R_H(\mu, \nu)$ used while recording and the phase is deviated by π. Accordingly, $[-S_H(\mu, \nu)]$ can be diffracted from the hologram. The intensity distribution $I'(x',y')$ of the light incidented to the light detector is expressed in the following Formula (2).

$$I'(x',y')\{1-1/[a_{DC}\cos(\Delta\phi)]ts_H(x',y')\}2 \quad \text{Formula (2)}$$

It is understood from comparing Formulas (1) and (2) that the contrasts of $I(x',y')$ and $I'(x',y')$ are reversed to each other.

EXAMPLES

Hereafter, concrete explanations regarding the present invention will be explained with examples, however, the present invention is not limited to these examples.

Experiments will be performed using a device having the same configuration as the device shown in FIG. 2 and the effects of the present invention will be confirmed.

A 532 nm wavelength laser source is used for the light source 50. The focal distances of the Fourier transforming lenses 62, 64 are respectively made 150 mm and 100 mm. Lenses with a focal distance of 20 mm are used for the Fourier transforming lenses 66, 74. A liquid crystal panel having 1024×768 pixels (256 grayscale/pixel with pixel length at one side being 19 μm) is used for the SLM 58. A CMOS image sensor that receives light of one pixel of the SLM 58 at 6×6 pixels is used for the light detector 76. A filter that absorbs and removes DC component at a central area of 100 μm×100 μm is used for the mask 68, and this is arranged at the focal position for the Fourier transforming lenses 62, 64. An azo polymer film with a film thickness of 250 μm is used for the optical recording medium 72.

Next, the image data used in the experiment is created as follows. First, binary digital data [0,1] is respectively expressed as successive pixels of black/white pixels and white/black pixels (black pixels: brightness 0; white pixels: brightness 255). With this encoding method, [black/white pixels] are determined as [0] and [white/black pixels] are determined as [1]. Further, the signal pattern region is made 320×320 pixels. The reference pattern region that is in the periphery of the signal pattern is made to be a binary random image. FIG. 6A is a recording pattern displayed on the SLM 58 when recording.

Figure 6C:
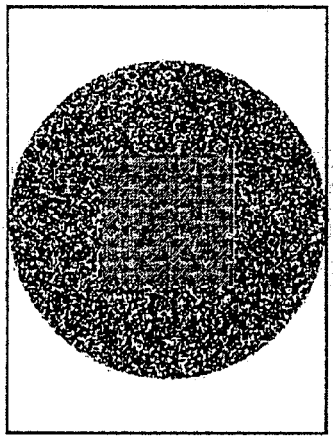
FIG. 6C is a readout pattern P used in the reconstruction of the second reconstructed image in an executed example.
Figure 6B:
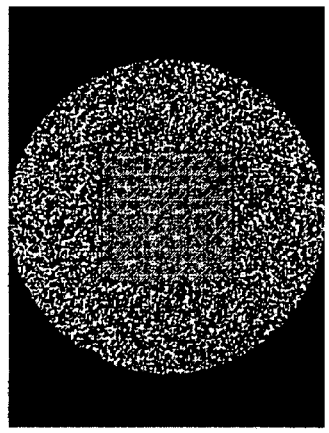
FIG. 6B is a readout pattern N used in the reconstruction of the first reconstructed image in an executed example.
Figure 6A:
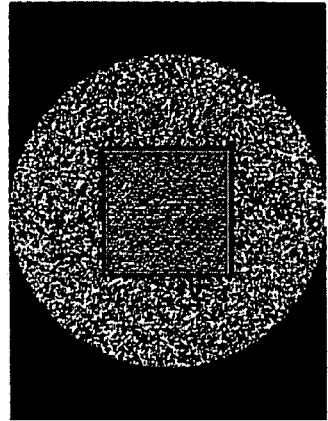
FIG. 6A is a drawing showing a recording pattern used in an executed example.

In contrast, FIG. 6B is a readout pattern N displayed on the SLM 58 at the time of acquisition processing of the first reconstructed image (negative image), and FIG. 6C is a readout pattern P displayed on the SLM 58 at the time of acquisition processing of the second reconstructed image (positive image). Images where all of the pixels have a brightness of 192 are displayed on the signal pattern regions of the readout patterns N, P. Due to this, the light that transmits through the signal pattern region of the SLM 58 is added to the diffracted light as DC component of the signal beam.

Further, the reference pattern of the readout pattern N is the same as the reference pattern at the time of recording, however, the reference pattern of the readout pattern P is a reversed image of the reference pattern at the time of recording. Due to this, reference beam (where the brights and darks are reversed to the reference beam irradiated when reconstructing the first reconstructed image) are irradiated on the optical recording medium 72 when reconstructing the second reconstructed image.

First, the recording pattern shown in FIG. 6A is used and the signal beam and reference beam are Fourier transformed, and the Fourier transformed image of the signal pattern is recorded in the optical recording medium 72 as a intensity-modulated hologram. Next, the readout pattern shown in FIG. 6B is used and this pattern is displayed on the SLM 58. Readout beam is generated, the generated readout beam is irradiated on the recorded hologram, and reconstruction of a negative image is performed. The reconstructed image is detected by the light detector 76, and a histogram is generated and evaluated. A portion of the reconstructed image is shown in FIG. 7A and the histogram is shown in FIG. 7B.

The horizontal axis of the histogram shows the difference in brightness values expressed with 256 grayscale/pixel, and the vertical axis shows the occurrence of pixel value. The black dots plot the values (differences) that are obtained by subtracting the brightness of the white pixels from the brightness of the black pixels. The white dots plot the values (differences) that are obtained by subtracting the brightness of the black pixels from the brightness of the white pixels. There is high contrast, enough so that the distribution of black dots and the distribution of white dots are largely separated left to right, and the digital data [0] and [1] can be clearly determined. The bit error rate (BER) can be sought by performing probability calculation from this histogram.

Figure 8A:
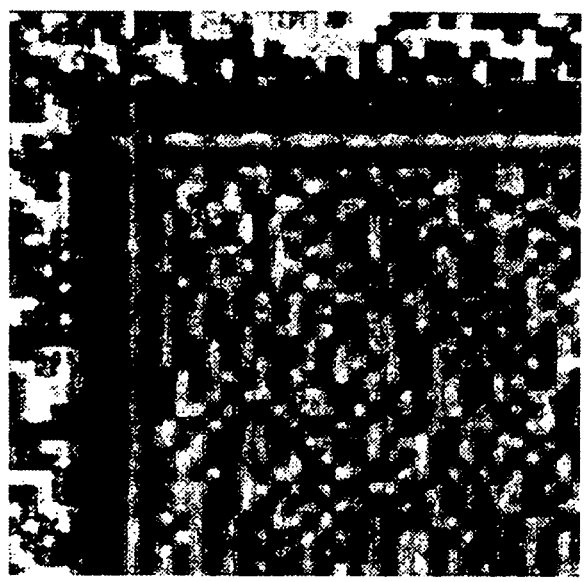
FIG. 8A is a partially enlarged drawing of the second reconstructed image.
Figure 8B:
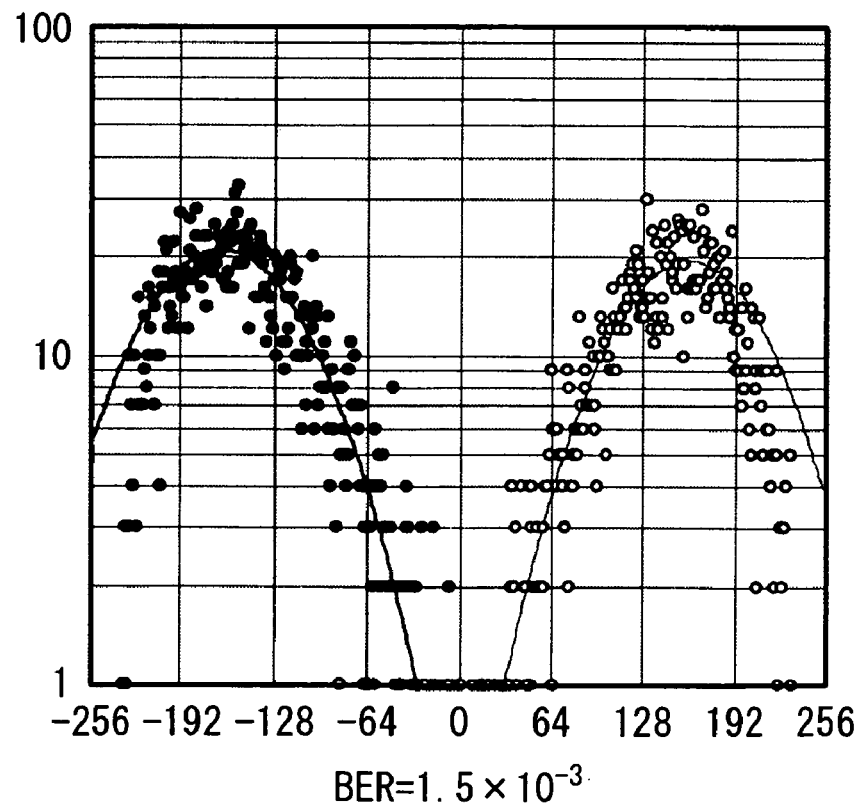
FIG. 8B is a histogram of the second reconstructed image.

Next, the readout pattern shown in FIG. 6C is used and this pattern is displayed on the SLM 58. Readout beam is generated, the generated readout beam is irradiated on the hologram, and reconstruction of a positive image is performed. The reconstructed image is detected by the light detector 76, and a histogram is generated and evaluated. A part of the reconstructed image is shown in FIG. 8A and the histogram is shown in FIG. 8B. Also, the above-described negative image is subtracted from the above-described positive image and a third reconstructed image is generated. A part of the reconstructed image is shown in FIG. 9A and the histogram is shown in FIG. 9B.

Figure 7A:
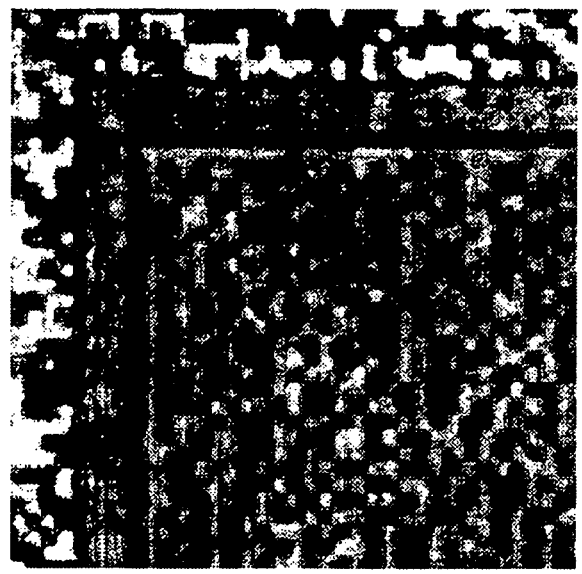
FIG. 7A is a partially enlarged drawing of the first reconstructed image.
Figure 7B:
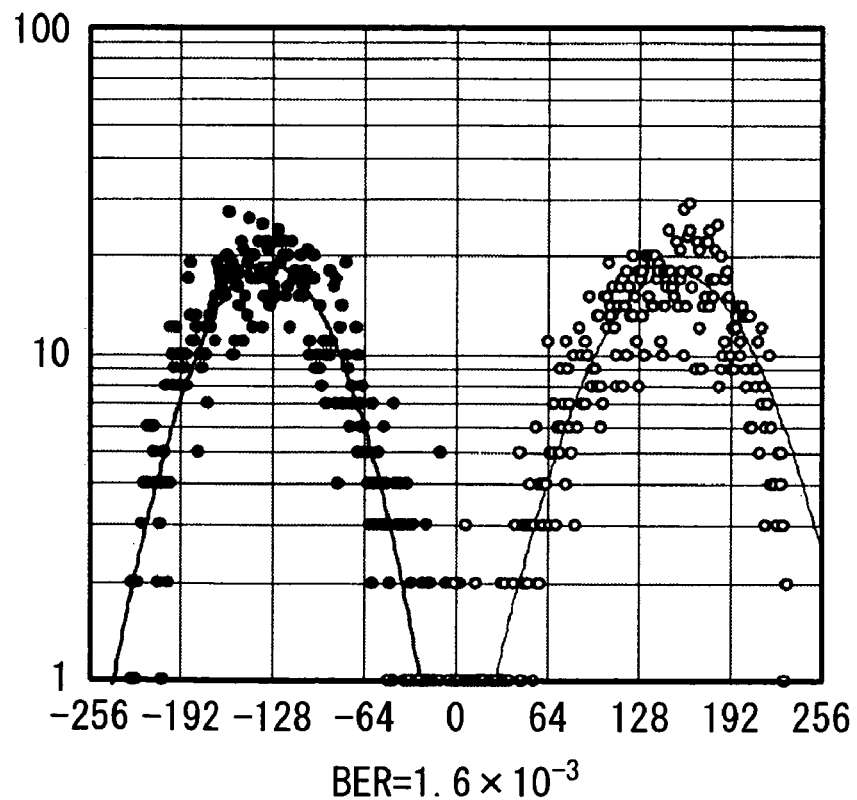
FIG. 7B is a histogram of the first reconstructed image.

As is understood from the experiment results, when the readout pattern shown in FIG. 6B is used, the negative image as shown in FIG. 7A can be obtained. When the readout pattern shown in FIG. 6C is used, the positive image as shown in FIG. 8A can be obtained. A positive image as shown in FIG. 9A can be obtained as the third reconstructed image by subtracting the negative image from this positive image.

Figure 9A:
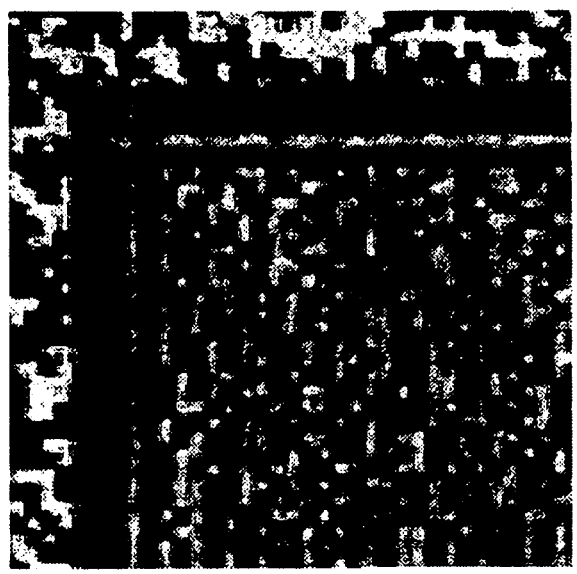
FIG. 9A is a partially enlarged drawing of the a reconstructed image.

It can be seen that with the reconstructed image of FIG. 9A, the contrast is improved more than the reconstructed images of FIGS. 7A and 8A. Further, it can also be seen in the histogram shown in FIG. 9B that the distribution of black dots and white dots is greatly separated left to right, and that the contrast is improved.

Figure 9B:
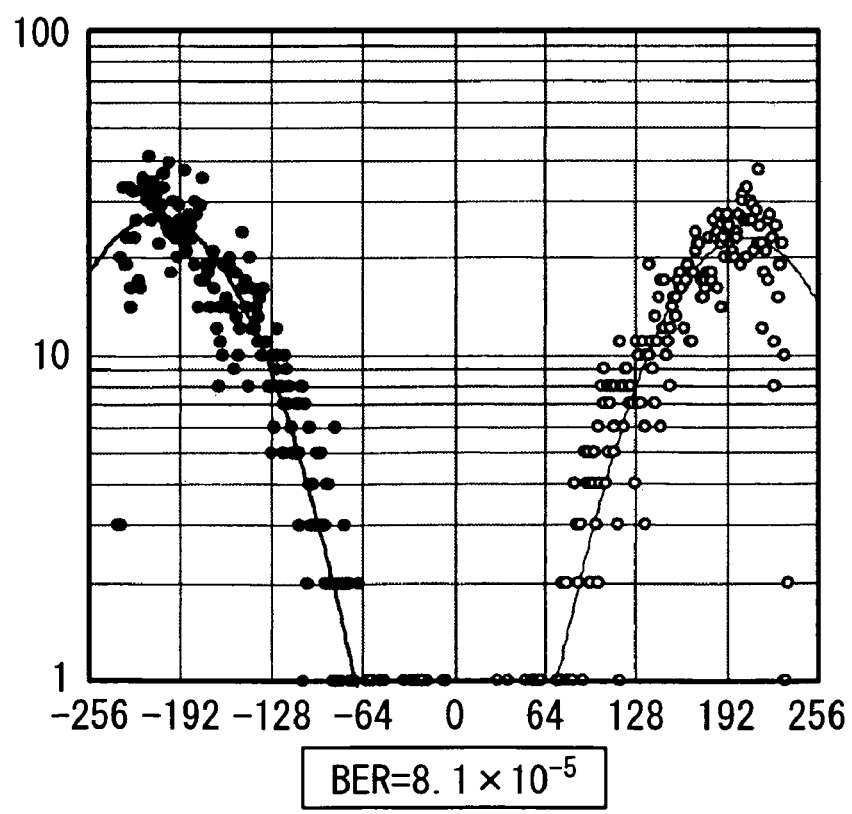
FIG. 9B is a histogram of the third reconstructed image.

Furthermore, the BER found from the histogram of the first reconstructed image shown in FIG. 7B is $1.6 \times 10^{-3}$, and the BER found from the histogram of the second reconstructed image shown in FIG. 8B is $1.5 \times 10^{-3}$, whereas the BER found from the histogram shown in FIG. 9B is $8.1 \times 10^{-5}$, which is two orders of magnitude less than the others so it is clear that the BER is vastly improved.

Note that in FIG. 6C, the entire outer side of the reference pattern is white pixels, however, this region can be any brightness as long as it is a region of even brightness. In order to suppress unnecessary exposure to the optical recording medium, it is preferable to use black pixels (dark pixels).

What is claimed is:

1. A hologram reconstruction method comprising:
    onto an optical recording medium in which a hologram is recorded by simultaneously irradiating the Fourier transformed signal beam representing a digital data with a bright and dark image and removing a DC component and the Fourier transformed reference beam thereon, irradiating a first reference beam for reading out that is the same as the reference beam to generate a first diffracted light generated by the recorded hologram, and synthesizing a DC component of a predetermined phase with the generated first diffracted light to generate a first synthesized light;
    detecting an inverse Fourier transformed image of the first synthesized light to obtain first image data;
    irradiating a second reference beam for reading out that differs from the reference beam onto the hologram recorded on the optical recording medium to generate a second diffracted light from the recorded hologram, and synthesizing a DC component of a predetermined phase with the generated second diffracted light to generate a second synthesized light;
    detecting an inverse Fourier transformed image of the second synthesized light to obtain second image data;
    subtracting one of the first image data and the second image data from the other at each pixel of the light and dark image; and
    decoding the digital data based on the value obtained by subtraction.

2. The hologram reconstruction method of claim 1, wherein the second reference beam for reading out has a spatial frequency distribution that is the same as that of the reference beam used for recording but has a different phase.

3. The hologram reconstruction method of claim 1, wherein the second reference beam for reading out has a spatial frequency distribution that is the same as that of the reference beam used for recording and the phase differs by $\pi$ radians.

4. The hologram reconstruction method of claim 1, wherein the brights and darks of the second reference beam for reading out are reversed from those of the reference beam used for recording.

5. The hologram reconstruction method of claim 1, wherein the first reference beam and the second reference beam are made to be different so that the first image data and the second image data become reciprocally reversed images.

6. The hologram reconstruction method of claim 1, wherein all or part of the DC component of the signal beam is synthesized with the first diffracted light or the second diffracted light.

7. The hologram reconstruction method of claim 1, wherein the DC component synthesized with the first diffracted light and the DC component synthesized with the second diffracted light are the same.

8. The hologram reconstruction method of claim 1, wherein when the 1 of binary digital data is made to correspond to bright portions and the 0 is made to correspond to dark portions, and 1 is determined to be the code of positive pixels from the value obtained by subtraction and 0 is determined to be the code of negative pixels from the value obtained by subtraction.

9. The hologram reconstruction method of claim 1, wherein when the 0 of binary digital data is made to correspond to bright portions and the 1 is made to correspond to dark portions, 0 is determined to be the code of negative pixels from the value obtained by subtraction and 1 is determined to be the code of positive pixels from the value obtained by subtraction.

10. The hologram reconstruction method of claim 1, wherein when the digital data is expressed with multiple values, the digital data is decoded based on the value obtained by subtraction.

11. The hologram reconstruction method of claim 1, wherein the phase of collimated light is modulated by an SLM and the DC component of a predetermined phase is generated.

12. The hologram reconstruction method of claim 1, wherein the amplitude and phase of collimated light is modulated by an SLM and the DC component of a predetermined amplitude and predetermined phase are generated.

13. A hologram reconstruction method comprising:
    onto an optical recording medium in which a hologram is recorded by simultaneously irradiating the Fourier transformed signal beam representing a digital data with a bright and dark image and removing a DC component and the Fourier transformed reference beam thereon, irradiating a first reference beam for reading out that is the same as the reference beam to generate a first diffracted light generated by the recorded hologram, and synthesizing a DC component of a predetermined phase with the generated first diffracted light to generate a first synthesized light;
    detecting an inverse Fourier transformed image of the first synthesized light to obtain first image data;
    irradiating a second reference beam for reading out that differs from the reference beam onto the hologram recorded on the optical recording medium, generating a second diffracted light with the recorded hologram, and synthesizing DC component of a predetermined phase with the generated second diffracted light, whereby a second synthesized light is generated;
    detecting an inverse Fourier transformed image of the second synthesized light to obtain second image data;
    subtracting one of the first image data and the second image data from the other at each pixel of the light and dark image; and
    decoding the digital data based on the value obtained by subtraction.

14. The hologram reconstruction method of claim 13, wherein the second reference beam for reading out has a spatial frequency distribution that is the same as that of the reference beam used for recording but has a different phase.

15. The hologram reconstruction method of claim 13, wherein the second reference beam for reading out has a spatial frequency distribution that is the same as that of the reference beam used for recording and the phase differs by $\pi$ radians.

16. The hologram reconstruction method of claim 13, wherein the brights and darks of the second reference beam for reading out are reversed from those of the reference beam used for recording.

17. The hologram reconstruction method of claim 13, wherein the first reference beam and the second reference beam are made to be different so that the first image data and the second image data become reciprocally reversed images.

18. The hologram reconstruction method of claim 13, wherein all or part of the DC component of the signal beam is synthesized with the first diffracted light or the second diffracted light.

19. The hologram reconstruction method of claim 13, wherein the DC component synthesized with the first diffracted light and the DC component synthesized with the second diffracted light are the same.

20. The hologram reconstruction method of claim 13, wherein when the 1 of binary digital data is made to correspond to light portions and the 0 is made to correspond to dark portions, and 1 is determined to be the code of positive pixels from the value obtained by subtraction and 0 is determined to be the code of negative pixels from the value obtained by subtraction.

21. The hologram reconstruction method of claim 13, wherein when the 0 of binary digital data is made to correspond to light portions and the 1 is made to correspond to dark portions, 0 is determined to be the code of negative pixels from the value obtained by subtraction and 1 is determined to be the code of positive pixels from the value obtained by subtraction.

22. The hologram reconstruction method of claim 13, wherein when the digital data is expressed with multiple values, the digital data is decoded based on the value obtained by subtraction.

23. The hologram reconstruction method of claim 13, wherein the phase of collimated light is modulated by an SLM and the DC component of a predetermined phase is generated.

24. The hologram reconstruction method of claim 13, wherein the amplitude and phase of collimated light is modulated by an SLM and the DC component of a predetermined amplitude and predetermined phase is generated.

25. A hologram reconstruction device wherein digital data is displayed with a bright and dark image and a signal beam from which DC component has been removed and a reference beam are Fourier transformed and simultaneously irradiated onto an optical recording medium whereby a hologram is recorded, and the reconstruction device reconstructs the digital data from the hologram, the reconstruction device comprising:

a light source that projects coherent light;

a SLM provided with a modulation region, separated from a signal beam region and a reference beam region, where modulated pixels that modulate light incidented from the light source at the modulation region are lined many times two-dimensionally, and the SLM modulates each of the pixels for at least one of strength of incidented light and the phase in accordance with a pattern displayed in the modulation region;

a control unit that controls the SLM so that, at the time of hologram reconstruction, a DC component generating pattern is displayed in the signal beam region and the reference beam pattern is displayed in the reference beam region, and so that next, the DC component generating pattern is displayed in the signal beam region and a pattern that differs from the reference beam pattern is displayed in the reference beam region;

an irradiating unit that Fourier transforms at least one of DC component modulated and generated at the signal beam region and reference beams modulated and generated at the reference beam region and irradiates these onto the optical recording medium;

a data acquisition unit that detects an inverse Fourier transformed image of first synthesized light generated by synthesizing first diffracted light generated from the recorded hologram and DC component of a predetermined phase when the DC component generating pattern is displayed in the signal beam region of the SLM and when the reference beam pattern is displayed in the reference beam region; and which detects a reverse Fourier transformed image of second synthesized light generated by synthesizing first diffracted light generated from the recorded hologram and DC component of a predetermined phase when the DC component generating pattern is displayed in the signal beam region of the SLM while acquiring first image data and when a pattern that differs from the reference beam pattern is displayed in the reference beam region; and which acquires second image data;

a calculating unit that subtracts one of the first image data and the second image data from the other for each pixel of the light and dark image; and a decoding unit that decodes digital data based on the value obtained by subtraction.

* * * * *